United States Patent
Bollmann

(10) Patent No.: US 8,964,894 B2
(45) Date of Patent: Feb. 24, 2015

(54) CIRCUIT ARRANGEMENT FOR COMPENSATING AN ATTENUATION OCCURRING IN AN ANTENNA SIGNAL CONNECTION BETWEEN A MOBILE TERMINAL AND AN ANTENNA AND COMPENSATION METHOD FOR THIS PURPOSE

(71) Applicant: Bury Sp.z.o.o., Mielec (PL)

(72) Inventor: Eckhard Bollmann, Huellhorst (DE)

(73) Assignee: Bury Sp.z.o.o., Mielec (PL)

( * ) Notice: Subject to any disclaimer, the term of this patent is extended or adjusted under 35 U.S.C. 154(b) by 0 days.

(21) Appl. No.: 14/181,871

(22) Filed: Feb. 17, 2014

(65) Prior Publication Data
US 2014/0233675 A1    Aug. 21, 2014

(30) Foreign Application Priority Data
Feb. 18, 2013    (DE) .......................... 10 2013 101 590

(51) Int. Cl.
*H04K 1/02*    (2006.01)
*H04B 1/04*    (2006.01)

(52) U.S. Cl.
CPC .................................. *H04B 1/0475* (2013.01)
USPC ........... 375/297; 375/295; 375/296; 375/299; 375/316; 375/340

(58) Field of Classification Search
CPC .. H04B 1/1027; H04B 1/3877; H04B 1/0475; H04B 7/0413; H04B 7/046; H04B 7/063; H04B 7/0665; H04B 7/0691; H04B 7/086; H04B 7/18513; H04B 7/18515; H04B 7/18528; H04B 7/18543; H04B 1/707; H03G 3/3068; H04L 2027/0053; H04L 2027/0057; H04L 2027/0087; H04L 27/2071; H04L 27/2273; Y10S 370/914

USPC ......... 375/262, 270, 284, 286, 295, 297, 299, 375/306, 316, 320, 329, 334, 340, 345
See application file for complete search history.

(56) References Cited

U.S. PATENT DOCUMENTS

| 6,690,915 B1 * | 2/2004 | Ito et al. ............................ 455/7 |
| 8,718,052 B2 * | 5/2014 | Nast et al. ..................... 370/360 |

(Continued)

FOREIGN PATENT DOCUMENTS

| EP | 1 602 179 | 2/2004 |
| WO | 2004/082162 | 9/2004 |

*Primary Examiner* — Hirdepal Singh
(74) *Attorney, Agent, or Firm* — Whitham Curtis Christofferson & Cook, PC

(57) ABSTRACT

A circuit arrangement (1) is described for compensating an attenuation (Ko, Ka, Ka1, Ka2) occurring in an antenna signal connection (2) between a mobile terminal (3) and an antenna (4) with at least one antenna signal amplifier (5a, 5b) in the antenna signal connection (2) and with a control unit (8) for setting an amplification factor (V) by which the antenna signal routed through an allocated antenna signal amplifier (5a, 5b) is amplified or attenuated. The circuit arrangement (1) has a detection unit (7) for detecting an antenna signal power (P) of the antenna signal in the signal path of the antenna signal connection (2). The control unit (8) is configured to adapt the amplification factor (V) at a rate of change slower than the control rate of an antenna signal power control loop between a coupled mobile terminal (3) and a base station (4) of a mobile network with which the mobile terminal (3) has a communication connection, to regulate the transmit power of the mobile terminal (3) at which an antenna signal is emitted by the mobile terminal (3) if the detected antenna signal power (P) lies in a range of a predefined lower limit value ($P_{G1}$) for the detected antenna signal power and a predefined upper limit value ($P_{G2}$) for the detected antenna signal power (P).

15 Claims, 2 Drawing Sheets

(56) References Cited

U.S. PATENT DOCUMENTS

Figure 1:
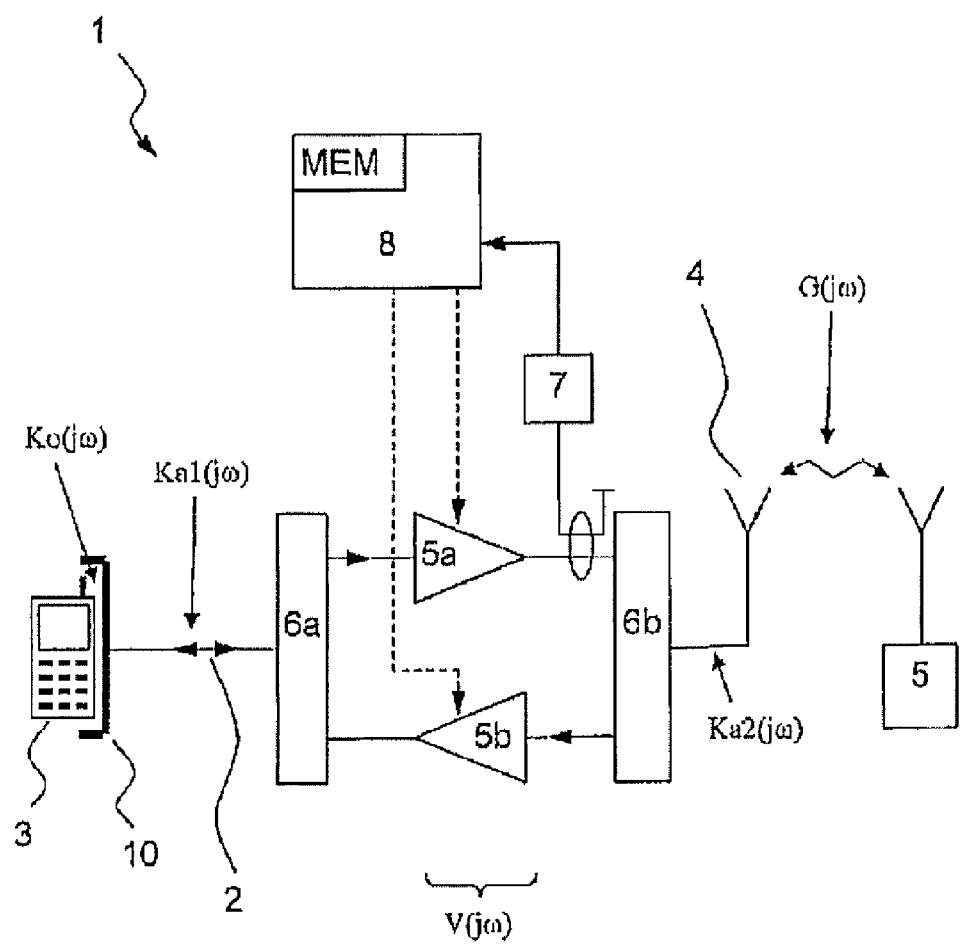

| | | | |
|---|---|---|---|
| 8,849,230 B2* | 9/2014 | Spalink | 455/250.1 |
| 2003/0100351 A1* | 5/2003 | Friesen et al. | 455/571 |
| 2004/0147230 A1* | 7/2004 | Nast et al. | 455/78 |
| 2006/0018414 A1* | 1/2006 | Arkhipenkov et al. | 375/345 |
| 2007/0071128 A1* | 3/2007 | Meir et al. | 375/297 |
| 2007/0142095 A1* | 6/2007 | Bollmann et al. | 455/569.2 |
| 2010/0151917 A1* | 6/2010 | Wilson | 455/571 |
| 2013/0035090 A1* | 2/2013 | Moshfeghi | 455/422.1 |

* cited by examiner

CIRCUIT ARRANGEMENT FOR COMPENSATING AN ATTENUATION OCCURRING IN AN ANTENNA SIGNAL CONNECTION BETWEEN A MOBILE TERMINAL AND AN ANTENNA AND COMPENSATION METHOD FOR THIS PURPOSE

The invention relates to a circuit arrangement for compensating an attenuation occurring in an antenna signal connection between a mobile terminal and an antenna with at least one antenna signal amplifier in the antenna signal connection and with a control unit for setting an amplification factor by which the antenna signal routed through an allocated antenna signal amplifier is amplified or attenuated.

The invention furthermore relates to a corresponding compensation method.

When a mobile terminal is connected to an external antenna, as occurs, for example, in hands-free devices in motor vehicles, an attenuation occurs in the signal path from the mobile terminal to the antenna and vice versa. Although the transmission and reception quality is intended to be improved by the external antenna, the attenuation results in a reduction in the signal quality.

The attenuation in a cable-connected connection of the mobile terminal to the antenna is in practice more or less constant and enables the operation of a compensation circuit with a constant amplification factor. However, with an electromagnetic, capacitive or inductive coupling of the mobile terminal to the antenna signal amplifier and the antenna connected thereto, the attenuation may vary depending on the current operating status and the mobile terminal that is used. A predefined constant amplification factor is not then optimal and can cause problems.

DE 10 2010 045 244 A1 discloses a circuit arrangement for compensating the attenuation in a radio frequency line between a mobile radio station and an antenna with a controller to control an antenna signal amplifier. In transmit mode, the operating point of the amplifier becomes higher than set in receive mode, i.e. the amplifier is then operated at higher power. The presence of transmitted radio signals is detected with a signal detector, wherein the signal detector and the controller are designed to control the amplifier by means of a control signal in such a way that the amplifier amplifies the transmitted radio signals in the case of a first predefined operating point of the amplifier, and amplifies the received radio signals in the case of a second predefined operating point of the amplifier.

EP 1 602 179 B1 describes a circuit arrangement for operating transceivers on an antenna with a plurality of constant-power amplifier modules through which a respectively allocated transmission signal of an allocated transmission standard is routed. Thus, for example, a GSM900 transmit signal is routed to a 4-watt amplifier module of the compenser and a GSM1800 signal is routed to the latter's 2-watt module.

EP 1 852 978 A2 discloses an assembly for transmitting signals via an antenna connection within a mobile phone user station which has a signal amplifier for amplification of the signals. The overall gain of the signals transmitted between an external antenna of the mobile radio subscriber station and a mobile radio subscriber device and/or vice versa is adjusted dependent on a connection attenuation. An adjustment unit for adjusting the overall gain and a detection device connected to the antenna connection for evaluating the signals transmitted via the antenna connection and for detecting an adjustment value to which the adjustment device is to be adjusted, are provided for this purpose. Information relating to the existing connection attenuation of the selected connection type and/or the type of the mobile phone is intended to be contained in the evaluated transmitted signals. This requires knowledge of a data transmission protocol and the suitability of a mobile terminal to provide such information.

On this basis, the object of the present invention is to produce an improved circuit arrangement for compensating an attenuation occurring in an antenna signal connection between a mobile terminal and an antenna, and also a compensation method for this purpose, with which a setting, adapted to the operational status, of the amplification factor of the at least one antenna signal amplifier takes place in a simple manner without access to information of the mobile terminal and without complex measurement of the attenuation actually currently present in the antenna signal connection.

The object is achieved by the circuit arrangement with the features of claim 1 and by the compensation method with the features of claim 9. Advantageous embodiments are described in the subclaims.

It is proposed that the circuit arrangement has a detection unit for detecting an antenna signal power of the antenna signal in the signal path of the antenna signal connection, and that the control unit is configured to adapt the amplification factor at a rate of change slower than the control rate of an antenna signal power control loop between a coupled mobile terminal and a base station of a mobile network with which the mobile terminal has a communication connection, to regulate the transmit power of the mobile terminal at which an antenna signal is emitted by the mobile terminal if the detected antenna signal power lies in a range of a predefined lower limit value for the detected antenna signal power and a predefined upper limit value for the detected antenna signal power.

The antenna signal power control loop between a coupled mobile terminal and a base station of a mobile network with which the mobile terminal has a communication connection, for regulating the transmit power of the mobile terminal, is also referred to below as "network-side power regulation" for short.

The circuit arrangement initially exploits the fact that the mobile terminal adapts in any event by means of a control loop with the base station to the existing overall attenuation between the mobile terminal and the base station, including the space attenuation between the antenna and the base station. The base station regulates mobile terminals in such a way that the mobile terminals transmit at the minimum possible power which is sufficient to ensure a proper communication between the mobile terminal and the base station without interfering with the communication with other mobile terminals. Starting with a predefined minimum amplification factor, the mobile terminal would thus automatically increase its transmit power on the basis of the control loop with the base station to the extent that the attenuation of the antenna signal connection varying in some cases during operation is equalized.

A setting of the amplification factor of the at least one allocated antenna signal amplifier is then superimposed on this control loop, i.e. the network-side power regulation, provided due to the nature of the system. For this purpose, a range is predefined with a lower and an upper limit value for the detected antenna signal power, in which, by means of an adaptation of the amplification factor of the allocated antenna signal amplifier carried out in addition to the regulation of the signal power of the mobile terminal, a positive effect develops which counteracts the variable attenuation in the antenna signal connection by the allocated at least one antenna signal amplifier with its adapted amplification factor. This is successful if the already provided regulation of the transmit power of the mobile terminal interacts with the adapted amplification. To do this, the amplification factor is adapted at a rate of change slower than the control rate of the antenna signal power control loop between the mobile terminal (i.e. the network-side power regulation) and the base station. As a result, the primary network-side power regulation is supported by the adaptation of the amplification factor without two control loops counteracting one another. Due to the range predefined with the limit values, it is then ensured that the circuit arrangement is operated in a permissible power range and adapts itself, in the predefined limit range in which an adaptation of the amplification factor is appropriate, to the actual present attenuation in the antenna signal path.

It is particularly advantageous if the control unit is configured to adapt the amplification factor in a prescribed setting range for the amplification factor. By means of a setting range of this type, a minimum amplification factor can be defined, for example, so that the amplification in the case of an assumed lowest coupling loss equalizes the latter exactly. The upper limit of the setting range can then be defined accordingly in such a way that a specific amplification value is in turn attainable for all relevant mobile terminals with an assumed highest coupling loss, so that, in the case of the assumed highest coupling loss, the latter is equalized. By means of a setting range of this type, the compensation can be successfully carried out in an amplification range which is adapted to the realistic conditions and with which an overdrive is avoided as far as possible. The amplification factor is thus set by means of a setting range of this type essentially only for equalizing the coupling loss.

The amplification factor cannot only be increased slowly. It is conceivable for the amplification factor to be reduced slowly compared with the control rate of the network-side power regulation to the predefined minimum amplification factor. The slow reduction in the amplification factor is preferably effected in a range after a critical high range of the antenna signal power has again been left. Not only the understepping of the predefined minimum limit value by the antenna signal power can be used as triggering criteria for the step of this slow resetting of the amplification factor. It is also conceivable for the resetting to take place only after a defined time delay, wherein the antenna signal power must still be less than or, where appropriate, equal to the relevant limit value after the time delay also, the reduction being triggered when said limit value is reached.

The control unit is preferably configured to set a predefined minimum amplification factor if the detected antenna signal power is less than the predefined lower limit value. A minimum amplification factor of this type is preferably adapted, assuming a lowest coupling loss, to equalize this lowest coupling loss, so that, in the case of an antenna signal power below the lower limit value, an at least partial equalization of the coupling loss still takes place.

It is furthermore advantageous if the control unit is configured to reduce the amplification factor if the detected antenna signal power is greater than the predefined maximum limit value. The amplification factor is then reduced to a value at which the detected antenna signal power is maximized to the predefined maximum limit value but no longer exceeds the latter. The signal radiated by the antenna is thus prevented from exceeding the maximum permissible upper limit value.

In this connection, it is particularly advantageous if the circuit arrangement has a memory to store a maximum possible amplification factor and the control unit is configured to store the reduced amplification factor in the memory and to specify a maximum possible amplification factor. This reduced amplification factor, set by reducing the amplification factor when the predefined maximum limit value is exceeded, is adaptively defined due to its storage as a limit value which must no longer be exceeded in the further adaptation of the amplification factor in a setting cycle. It is thus ensured that a further exceeding of the predefined maximum limit value in the event of further adaptation of the amplification factor is largely prevented.

In this connection, it is particularly advantageous if the control unit is configured to reset a stored, maximum possible amplification factor if an antenna signal power is detected which is less than the predefined lower limit. As a result, the maximum possible amplification factor is ignored in the event of a following adaptation until a new maximum possible amplification factor is stored. The stored maximum possible amplification factor is thus valid only until a predefined lower limit value of the detected antenna signal power is understepped. A new setting cycle then begins, since such an understepping of the predefined lower limit value is an indication of the removal of a mobile terminal from a coupling pod or an indication of the termination of a communication connection. Since the coupling conditions can then change significantly, a new setting cycle begins when the predefined lower limit value is understepped by the antenna signal power.

The detection unit is preferably built into the circuit arrangement in such a way, in terms of the signal technology, that the antenna signal power is detected at the output of at least one allocated transmit amplifier which serves to amplify an antenna signal emitted by the mobile terminal. The detection of the antenna signal power as the transmit power of the mobile terminal has the advantage that this power of the transmit signal is substantially higher than the power of the receive signal. The change in this signal power can be detected from the noise of the antenna signal with close correlation with the power regulation of the antenna signal power control loop between the mobile terminal and the base station, and can be used as the variable employed in the adaptation of the amplification factor.

It is particularly advantageous if the control unit is configured to adapt the amplification factor of at least one transmit amplifier which serves to amplify an antenna signal emitted by the mobile terminal. A setting of at least one allocated receive amplifier which serves to amplify an antenna signal received via the antenna, e.g. of a base station, then takes place, depending on the adapted amplification factor of the allocated transmit amplifier. The adaptation of the amplification of the compenser thus preferably takes place on the basis of the transmit signal of a connected mobile terminal. This adapted amplification factor is then used directly or proportionally to the setting of the receive amplification factor.

In a manner corresponding to the circuit arrangement, the object is achieved by the method for compensating an attenuation occurring in an antenna signal connection between a mobile terminal and an antenna using at least one transmit amplifier in the antenna signal connection by the following steps:

detecting an antenna signal power of the antenna signal in the signal path of the antenna signal connection, and adapting the amplification factor at a rate of change slower than the control rate of an antenna signal power control loop between a coupled mobile terminal and a base station of a mobile network with which the mobile terminal has a communication connection, to regulate the transmit power of the mobile terminal at which an antenna signal is emitted by the mobile terminal if the detected antenna signal power lies in a range of a predefined lower limit value for the detected antenna signal power and a predefined upper limit value for the detected antenna signal power.

The detection of the antenna signal power can be carried out continuously or at regular or irregular intervals by a detection unit during the operation of a compensation circuit. The same applies to the step of adapting the amplification factor, so that the two steps of detecting the antenna signal power and adapting the amplification factor interlock with one another and are carried out repeatedly.

Advantageous embodiments are described in the subclaims.

With the circuit arrangement and the method, it is achieved that a compensation is carried out in a predefined power control range. It is ensured here that, at the lowest transmit power of a mobile terminal, the antenna signal power at the antenna base does not exceed a predefined lower limit value. It can furthermore be ensured that, at a highest transmit power of a mobile terminal, the antenna signal power at the antenna base does not exceed a predefined upper limit value. It can furthermore be achieved that, at the highest transmit power of a mobile terminal, the antenna signal power at the antenna base also reaches the predefined upper limit value, so that the antenna signal power is not too far limited as a precaution.

Figure 2:
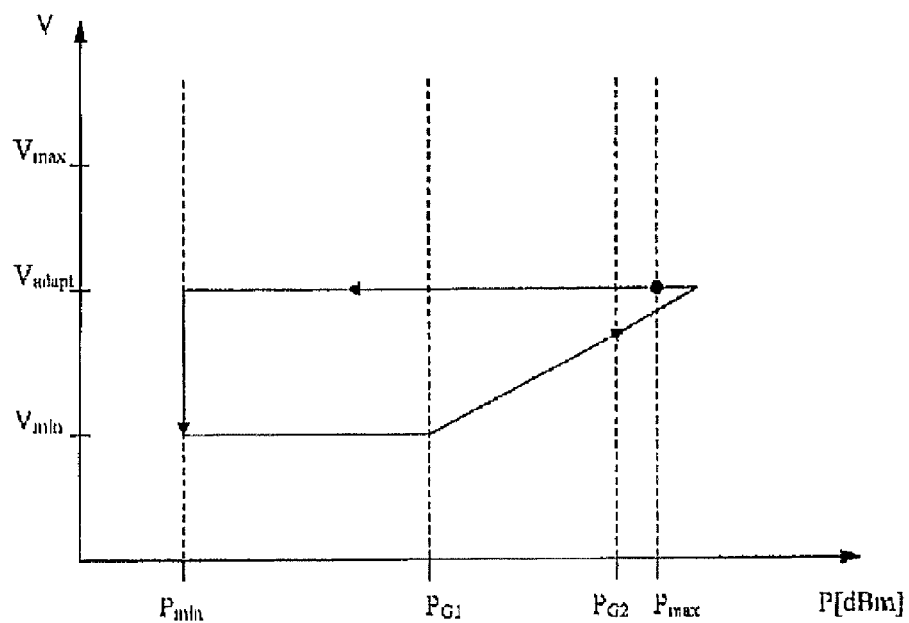
Figure 3:
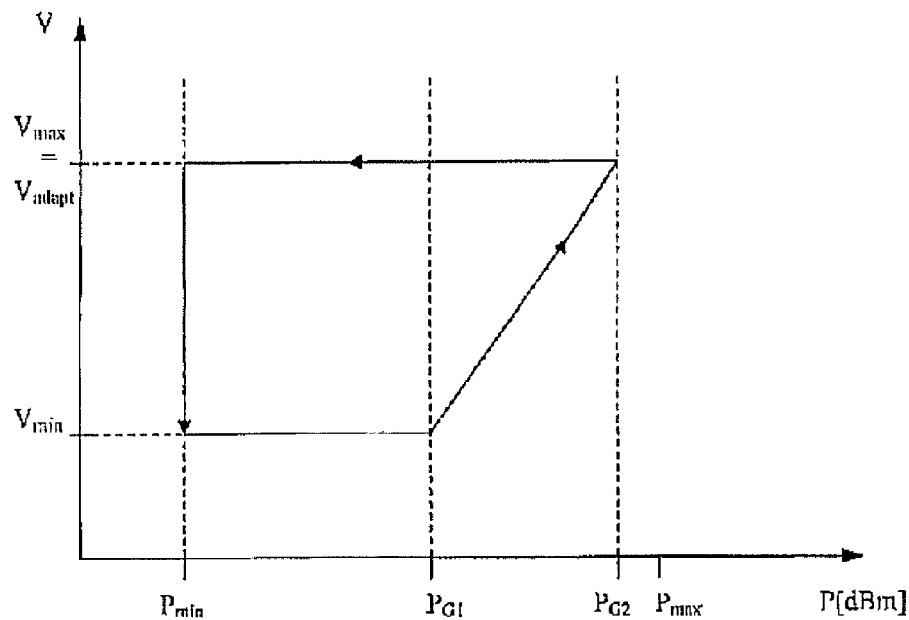

The invention is explained in detail below by way of example with reference to the attached drawings. In the drawings:

FIG. 1—shows a block diagram of a circuit arrangement for compensating a coupling loss between a mobile terminal and an antenna;

FIG. 2—shows a diagram of a characteristic of the setting of an amplification factor depending on the detected antenna signal power;

FIG. 3—shows a diagram of a different possible characteristic of the setting of the amplification factor depending on the detected signal power.

FIG. 1 shows a block diagram of a circuit arrangement 1 for compensating an attenuation occurring in an antenna signal connection 2 between a mobile terminal 3 and an antenna 4. The circuit arrangement 1 has at least one antenna signal amplifier 5a, 5b. The upper antenna signal amplifier 5a is a transmit amplifier for amplifying an antenna signal emitted by the mobile terminal 3 in the direction of the antenna 4. The lower antenna signal amplifier 5b is a receive amplifier for amplifying the antenna signal emitted by a base station 5 and detected by the antenna 4, said signal being forwarded to the mobile terminal 3.

For operation, e.g. according to the 4G standard (UMTS, LTE), the transmit amplifier 5a and the receive amplifier 5b are operated simultaneously. The antenna signal is then split on the input side and the output side by the antenna signal amplifiers 5a, 5b using duplexers 6a, 6b so that a lower frequency range of the frequency band for which the circuit arrangement 1 is designed is routed e.g. through the receive amplifier 5b, and an upper frequency band is routed through the transmit signal amplifier 5a or vice versa.

It is furthermore recognizable that a detection unit 7 is coupled to the output of the transmit signal amplifier 5a in order to detect the antenna signal power of the antenna transmit signal. This detected antenna signal power is fed directly or as proportional analog or digital information to a control unit 8. This control unit 8 may, for example, be a suitably programmed microcontroller, microprocessor or ASIC, FPGA or similar. However, it is also conceivable for the control unit 8 to be set up as a discrete logic circuit. The output of the control unit 8 is connected on the one hand with a first control line into the transmit signal amplifier 5a and with a second control line to the receive signal amplifier 5b. The antenna signal amplifiers 5a, 5b are controlled via this control line in order to set an amplification factor of the allocated antenna signal amplifiers 5a, 5b.

If the circuit arrangement 1 is to be configured to compensate antenna signals in a plurality of frequency bands and, where appropriate, also to support further communication standards such as GSM, a corresponding circuit can be set up in parallel for each further supported communication frequency band or for each further supported communication standard. The circuit can then be connected either by means of high-frequency switches or by means of frequency filters to the antenna 4 and to the antenna line leading from the mobile terminal 3. This is sufficiently known per se, e.g. from the aforementioned EP 1 602 179 B1 or e.g. from DE 10 2007 004 911 A1.

It is conceivable for a common control unit 8 to be used in an arrangement of this type with a plurality of pairs of transmit signal amplifiers 5a and receive signal amplifiers 5b for different mobile communications standards or different frequency ranges. A dedicated detection unit 7 can be provided here for each group. However, it is advantageous if the antenna signal power is then looped in with a common detection unit 7 in the antenna feed line between the antenna 4 and the first high-frequency switch or duplexer.

It is furthermore recognizable that the mobile terminal 3 in the example embodiments shown is not connected directly to the circuit arrangement 1 by means of a supply cable. In fact, a coupling pod 10 is provided, with which the antenna signal of the mobile terminal 3 is inductively, capacitively or electromagnetically decoupled into the circuit arrangement 1 to the transmit signal amplifier 5a. Accordingly, a receive signal received via the antenna 4 and amplified by the receive signal amplifier 5b is transmitted inductively, capacitively or electromagnetically via the charging pod 10 to the antenna of the mobile terminal 3.

The antenna signal emitted at an output power Pm(jω) undergoes a coupling loss Ko(jω) via the antenna coupling via the coupling pod 10. Furthermore, a cable loss Ka1(jω) is present in an antenna signal connection 2 between the coupling pod 10 and the duplexer 6a and also the transmit signal amplifier 5a connected thereto. A cable loss Ka2(jω) similarly occurs between the output of the transmit signal amplifier 5a and the antenna 4. Furthermore, a space attenuation G(jω) dependent on the distance from the antenna 4 to the base station 5 and on the ambient conditions (geography, weather, etc.) is present.

With the amplification V(jω), the power Pb(jω) of an antenna signal emitted by the mobile terminal 3 at the output power Pm(jω) and received by the base station 5 is then:

$$Pb(j\omega)=Pm(j\omega)*Ko(j\omega)*Ka1(j\omega)*V(j\omega)*Ka2(j\omega)*G(j\omega).$$

Since the respective transmission bands are relatively narrowband, the frequency dependency can be assumed to be very low. The variables Pb, Pm, Ko, Ka1, V, Ka2 and G can therefore be assumed to be frequency-independent variables. In simplified terms, this produces the following:

$$Pb=Pm*Ko*Ka1*V*Ka2*G.$$

In the operation of a mobile terminal 3 in a mobile network, it is to be ensured that the antenna signal power radiated by the antenna 4 is operated in a predefined power control range with a predefined minimum limit value $P_{min}$ and a predefined maximum limit value $P_{max}$. In UMTS, $P_{min}$ is e.g. −50 dBm and $P_{max}$=+24 dBm.

It is furthermore prescribed that, at the lowest transmit power of the mobile terminal 3 and with the circuit arrangement 1, the antenna signal power at the base of the antenna 4 must not exceed the predefined minimum limit value $P_{min}$.

It is furthermore prescribed that, at the highest transmit power, the power at the base of the antenna 4 must not exceed the predefined maximum limit value $P_{max}$.

However, it must furthermore be ensured that, at the highest transmit power, the power at the base of the antenna also reaches the maximum limit value.

In order to then satisfy these specified boundary conditions in the case of an unknown and changing attenuation, if possible for every mobile terminal 3, without knowledge of the type and nature of the mobile terminal 3, the amplification factor V is adapted by the control unit 8 in the manner described below.

It must be ensured here that the received antenna signal power Pb arriving at the base station 4 is equally high for every mobile terminal 3 transmitting in the radio cell.

The cable losses Ka1 and Ka2 are constant and do not change during the operation of the circuit arrangement if e.g. the circuit arrangement is permanently installed in a motor vehicle. These losses can therefore be assumed to be constant known attenuation parameters and can be summarized as Ka=Ka1*Ka2.

The coupling loss Ko can also be regarded as constant for a setting cycle. A setting cycle may, for example, be the duration of a telephone call. The amplification V and the space attenuation G therefore remain as changing factors. If the amplification V and the space attenuation G change, the base station 5 cannot distinguish which of the two factors changes. A change in the amplification V could therefore equally well be a change in the space attenuation G, e.g. if a driver drives past a house and the antenna signal to the base station 5 is blocked.

It is then crucial that the aforementioned boundary conditions are satisfied by means of the control unit. To do this, the control unit 8 carries out the strategy for setting the amplification factor $V_f$ described below with reference to the diagrams in FIGS. 2 and 3.

A minimum amplification factor $V_{min}$ is defined in such a way that the circuit arrangement has the maximum value 1 due to the amplification V, the cable loss Ka and the coupling loss Ko through V*Ka*Ko. This means that a transmit signal of the mobile terminal 3 is amplified so that the antenna signal radiated by the antenna 4 corresponds to the power of the antenna signal transmitted by the mobile terminal 3. The cable loss Ka and the coupling loss Ko of the circuit arrangement 1 are equalized by means of the minimum amplification factor $V_{min}$. The definition of the minimum amplification factor $V_{min}$ is based on a mobile terminal 3 with the lowest coupling loss Ka. In defining the minimum amplification factor $V_{min}$, it is therefore conceivable, if a different mobile terminal 3 is used with a greater coupling loss Ko or if the mobile terminal 3 shifts on the coupling pod 10, thereby increasing the coupling loss Ko, that the overall attenuation of the circuit arrangement 1 is not completely equalized by the signal amplification with the antenna signal amplifier 5a, 5b.

Furthermore, a maximum amplification factor $V_{max}$ is defined so that, with the amplification V, the constant cable loss Ka and an assumed coupling loss Ko, a value of 1 is attainable for all relevant mobile terminals 3 for which the circuit arrangement 1 and, in particular, the coupling pod 10 are provided. The mobile terminal with the highest coupling loss Ko is assumed for defining the maximum amplification factor $V_{max}$. It is thus intended to be achieved that, with the worst possible coupling of the mobile terminal 3 to the antenna 4, the overall attenuation of the circuit arrangement 1, including the coupling loss Ko, is completely equalized.

The control unit 8 initially sets the amplification factor to the minimum amplification factor $V_{min}$. The antenna signal power P is then detected in a setting cycle. This is plotted in FIG. 2 in the unit dBm.

A setting of the amplification V of the transmit signal amplifier 5a and, proportionally hereto, of the receive amplifier 5b is then carried out as follows:

a) If no antenna signal or an antenna signal below the predefined minimum limit value $P_{min}$ is detected, the amplification is then set to the predefined minimum amplification factor. It is thus ensured that the boundary condition is satisfied that, at the lowest transmit power, the power at the base of the antenna 4 does not exceed the predefined minimum limit value $P_{min}$. With the minimum amplification factor, the antenna signal is in fact not amplified beyond the already existing cable loss and the lowest possible coupling loss so that the antenna signal power at the base of the antenna 4 corresponds at most to the antenna signal power of the mobile terminal 3 regulated in any case by the base station 5, but in practice lies below it.

b) If an antenna signal is detected with an antenna signal power P in the range of the predefined minimum limit value $P_{min}$ or, as shown, in the range from a predefined lower limit value $P_{G1}$ to a predefined upper limit value $P_{G2}$, the amplification V is slowly increased at a rate of 1 dB/s. This rate of change is shown in FIG. 2 as a linear rise in the amplification V with rising antenna signal power P. This rate of change is slower than the control rate of the network-side power regulation (i.e. of the antenna signal power control loop) between the mobile terminal 3 and the base station 5. The power of the mobile terminal 3 is adapted by the base station 5 in practice around one thousand five hundred times per second. The rate of change by the control unit 8 thus has a factor of 1:1500 compared with the control rate of the antenna signal power control loop. The rate of change for setting the amplification factor must be so slow compared with the control rate of the network-side power regulation that the fast regulation of the network-side power regulation is not compromised. It should, for example, be in the range of at least 1:10 and is favorably in a range of at least 1:100, 1:500 or less than 1:1000.

c) If an antenna signal power of the antenna signal is detected which exceeds the predefined maximum limit value $P_{max}$, the amplification V is abruptly reduced by the control unit 8 so that the antenna signal power of the antenna signal corresponds to the predefined maximum limit value $P_{max}$. This amplification value $V_{adapt}$ is then stored and must no longer be exceeded in the further adaptation during the call cycle or the setting cycle. In this way, the boundary condition is satisfied that, at the highest transmit power, the antenna signal power at the base of the antenna 4 must not exceed the predefined maximum limit value.

This stored maximum possible amplification factor $V_{adapt}$ is reset once more only if an antenna signal power of the antenna signal below the predefined minimum limit value $P_{min}$ is detected.

From the diagram of the amplification V over the antenna signal power P, it becomes clear that the amplification factor is adapted in the manner of a hysteresis curve. Here, the amplification factor, with a low antenna signal power up to a predefined lower limit value $P_{G1}$, is set to a predefined minimum amplification factor $V_{min}$ and is left there. It is therefore accepted that the circuit arrangement does not completely equalize the attenuation. An equalization of this type can in fact also be effected without problems and with an acceptable energy requirement by the mobile terminal 3 itself via the network-side power regulation of the mobile terminal 3 with the base station 5.

Only in the range of the predefined lower limit value $P_{G1}$ of e.g. +16 dBm and a predefined upper limit value $P_{G2}$ of e.g. +23 dBm does a setting of the amplification factor take place until the predefined maximum limit value $P_{max}$ is reached. The circuit arrangement 1 is then further operated at this value of the amplification factor $V_{adapt}$ during the setting cycle until the antenna signal power P reaches or understeps a predefined value, such as e.g. the predefined minimum limit value $P_{min}$ or a different defined value, such as $P_{G1}$, $P_{G2}$ or a value specifically defined for this purpose.

The resetting of the increased amplification factor $V_{adapt}$ to the predefined minimum amplification factor $V_{min}$ can take place abruptly, as shown in FIGS. 2 and 3. However, it is also conceivable for the amplification factor $V_{adapt}$ to be reduced slowly compared with the control rate of the network-side power regulation to the predefined minimum amplification factor $V_{min}$. The slow reduction of the amplification factor V is preferably effected in a range after a critical high range of the antenna signal power P has again been left. Not only the understepping of the predefined minimum limit value $P_{min}$ by the antenna signal power can be used as triggering criteria for the step of this abrupt or slow resetting of the amplification factor. It is also conceivable for the resetting to take place only after a defined time delay, wherein the antenna signal power must still be less than or, where appropriate, equal to the relevant limit value (e.g. $P_{min}$, $P_{G1}$, $P_{G2}$ or the like) after the time delay also.

FIG. 3 shows a diagram of the amplification V over the detected antenna signal power P with a second scenario. In turn, the amplification factor is again increased at a slower rate of change if the antenna signal power P reaches a predefined lower limit value $P_{G1}$ of e.g. +16 dBm and lies in a range of the predefined lower limit value $P_{G1}$ and a predefined upper limit value $P_{G2}$ of e.g. +23 dBm. In this shown example embodiment, when the predefined upper limit value $P_{G2}$ is reached, a predefined upper limit value $V_{max}$ for the amplification factor is reached, so that the amplification factor is set to this predefined upper limit value for the amplification factor. This is then also stored as the predefined maximum possible amplification factor. In this scenario, the predefined maximum limit value $P_{max}$ is not reached at all through the amplification by means of the circuit arrangement 1. Nevertheless, by defining the maximum amplification factor as the equalization of the maximum conceivable attenuation between the mobile terminal 3 and the antenna 4, it is ensured that the mobile terminal 3 is operated in relation to the radio communication with the base station 5 exactly as if no interposed circuit arrangement 1 were present. The influences of the interposed circuit arrangement 1 are thus at least completely equalized by the circuit arrangement 1 in this scenario also.

It is thus recognizable that the amplification factor V in the circuit arrangement 1 always changes at the following setting points:

a) The amplification increases from a specific transmit power level $P_{G1}$, if a predefined maximum limit value $V_{adapt}=V_{limit}$ has not previously been set.
b) The amplification V decreases if the output power P of the antenna signal extends beyond the maximum permissible power and exceeds a predefined maximum limit value $P_{max}$.
c) The amplification V decreases if the output power falls below a specific level. It is to be reduced in any case if the output power understeps the predefined minimum limit value $P_{min}$.

The adaptation of the amplification always restarts if the power regulation specifies a very low transmit power P or if transmission pauses occur, i.e. if the detected antenna signal power P is less than the predefined minimum limit value $P_{min}$ for the transmit antenna signal power P. To ensure that the adaptation is effected as infrequently as possible, the threshold for increasing the amplification should be set as high as possible. This means that the predefined lower limit value $P_{G1}$ is as close as possible to the predefined maximum limit value $P_{max}$, and is in any event closer to the predefined maximum limit value $P_{max}$ than to the predefined minimum limit value $P_{min}$. Thus, this lower limit value could be e.g. +16 dBm.

The threshold for resetting or reducing the amplification should be at the lowest possible antenna signal power, e.g. as shown in the case of the predefined minimum limit value. However, it is also conceivable for the reduction shown in FIGS. 2 and 3 to take place at a threshold value of the antenna signal power P which lies in a range between the minimum limit value $P_{min}$ and the predefined lower limit value $P_{G1}$. It would thus be conceivable that, a rest of the amplification is reset from $V_{adapt}$ to $V_{min}$ at an antenna signal power of e.g. −40 dBm takes place if the minimum limit value $P_{min}$ is −50 dBm. It is also advantageous to take account of a time delay in order to avoid an unnecessary resetting of the amplification factor in the event of only a transient signal power decrease.

With these measures, it is achieved that no adaptation takes place up to a transmit power up to the predefined lower limit value $P_{G1}$. For a mobile radio connection, the adaptation of the amplification is in any case significant only at the edge of a cell of the base station 5 in order to achieve the connection quality up to the maximum possible point in the communication cell.

The adaptation of the amplification factor is further explained with reference to two scenarios. A mobile terminal 3 with a good coupling, such as e.g. Ko*Ka=0.1, is assumed. This corresponds to an attenuation of 10 dB.

It is assumed that the circuit arrangement 1 with the antenna 4 is installed in a vehicle which moves in relation to the base station 5. The mobile terminal 3 is inserted into the coupling pod 10 of the circuit arrangement 1.

It is then assumed that the vehicle is at a medium distance from the base station 5. The transmit power of the mobile terminal 3 is then increased at the beginning of the call to around −20 dB. The amplification V of the circuit arrangement is then increased slowly from $V_{min}$=10 dB to $V_{max}$=18 dB if the detected antenna signal power exceeds a predefined lower limit value $P_{G1}$. In this condition, the attenuation losses are then overcompensated by 8 dB (V=18 dB−10 dB attenuation=8 dB). The UMTS power regulation of the base station 5 then reduces the transmit power of the mobile terminal 3 via the antenna signal power control loop to −28 dBm in order to equalize the overcompensation of 8 dB and to achieve that the required transmit power of −20 dBm is radiated on the transmit antenna. No interference with other mobile terminals 3 thus occurs.

If the vehicle then travels to the edge of a communication cell, the transmit power is increased by means of the antenna signal power control loop by the mobile terminal 3 through regulation of the base station gradually to +24 dBm. As soon as the output power of the transmit amplifier 5a is more than +24 dBm, this is abruptly limited by reducing the amplification factor to the predefined maximum limit value $P_{max}$=+24 dBm. The UMTS power regulation then attempts to increase the transmit power of the mobile terminal 3 up to the predefined maximum limit value of $P_{max}$=+24 dBm. However, due to the reduction of the amplification V, the output power on the antenna 4 and therefore the received power remain constant. The same effect would also occur if a mobile terminal 3 without an antenna amplifier 5a were to move further away at the edge of the cell. Here, the increase in the transmit power P would be compensated by the deterioration in the radio link and the power Pb received by the base station 5 would remain the same. The behavior of the circuit arrangement 1 does not therefore have a negative effect on the mobile system.

If the circuit arrangement 1 is in the overcompensated condition with an amplification of V=$V_{max}$=+18 dB and the vehicle moves in the direction of the base station 5, the transmit power of the mobile terminal 3 is continually reduced. Below a threshold value of the transmit power of P of e.g. −40 dBm or of $P_{min}$, the amplification V is again set to the predefined minimum amplification factor $V_{min}$ so that the overcompensation does not cause a network problem.

In a second scenario, a telephone with a poor coupling of e.g. Ko*Ka=0.016 is assumed. This corresponds to an attenuation of +18 dB.

It is assumed that the vehicle is at a medium distance from the base station 5.

The transmit power of the mobile terminal 3 is then increased at the beginning of the call by means of the antenna signal power control loop to around −20 dBm. The amplification V of the circuit arrangement 1 is then slowly increased from the predefined minimum amplification factor $V_{min}$=10 dB to the predefined maximum amplification factor $V_{max}$=18 dB. In this condition, the losses are completely compensated and the required antenna signal power of −20 dBm is radiated on the transmit antenna. No interference with other mobile terminals thus occurs.

If the vehicle then travels to the edge of a communication cell, the transmit power of the mobile terminal 3 is increased gradually due to the nature of the system by means of the antenna signal power control loop to +24 dBm. The required maximum transmit power of Pmax=+24 dBm is then also radiated on the external antenna 4 due to the setting of the amplification factor to the predefined maximum amplification factor, which completely compensates the attenuation of the circuit arrangement 1.

If the circuit arrangement 1 is in the amplification condition $V_{max}$=18 dB and the vehicle moves in the direction of the base station 5, the transmit power of the mobile terminal is continually reduced by means of the antenna signal power control loop between the mobile terminal 3 and the base station 5. Below a threshold value of the transmit power of e.g. −40 dBm or of the predefined minimum limit value $P_{min}$, the amplification is again set to the predefined minimum amplification factor $V_{min}$=+10 dB. If the transmit output power is regulated to the predefined minimum limit value $P_{min}$=−50 dBm, an antenna signal power of P of −58 dBm is actually emitted on the transmit antenna 4. This is slightly less power than the base station 5 would expect. However, the same effect would also occur if the vehicle were to move slightly further away from the base station 5, so that this behavior does not result in harmful effects in the mobile system. The transmit output power is then adapted to the required value via the antenna signal power control loop by increasing the transmit signal power of the mobile terminal 3.

The invention claimed is:

1. Circuit arrangement for compensating an attenuation (Ko, Ka, Ka1, Ka2) occurring in an antenna signal connection between a mobile terminal and an antenna with at least one antenna signal amplifier in the antenna signal connection and with a control unit for setting an amplification factor (V) by which the antenna signal routed through an allocated antenna signal amplifier is amplified or attenuated, wherein the circuit arrangement has a detection unit for detecting an antenna signal power (P) of the antenna signal in the signal path of the antenna signal connection, and wherein and that the control unit is configured to adapt the amplification factor (V) at a rate of change slower than the control rate of an antenna signal power control loop between the coupled mobile terminal and a base station of a mobile network with which the mobile terminal has a communication connection, to regulate the transmit power of the mobile terminal at which the antenna signal is emitted by the mobile terminal if the detected antenna signal power (P) lies in a range of a predefined lower limit value ($P_{G1}$) for the detected antenna signal power (P) and a predefined upper limit value ($P_{G2}$) for the detected antenna signal power (P).

2. Circuit arrangement according to claim 1, wherein the control unit is configured to adapt the amplification factor (V) in a prescribed setting range for the amplification factor (V).

3. Circuit arrangement according to claim 1, wherein the control unit is configured to set a predefined minimum amplification factor ($V_{min}$) if the detected antenna signal power (P) is less than the predefined lower limit value ($P_{G1}$).

4. Circuit arrangement according to claim 1, wherein the control unit is configured to reduce the amplification factor (V) if the detected antenna signal power (P) is greater than a predefined maximum limit value ($P_{max}$), wherein the amplification factor (V) is reduced to a value at which the detected antenna signal power (P) is maximized to the predefined maximum limit value ($P_{max}$) but no longer exceeds the latter.

5. Circuit arrangement according to claim 4, wherein the circuit arrangement has a memory (MEM) to store a maximum possible amplification factor ($V_{limit}$) and the control unit is configured to store the reduced amplification factor ($V_{adapt}$) in the memory (MEM) and to specify a maximum possible amplification factor ($V_{limit}$).

6. Circuit arrangement according to claim 5, wherein the control unit is configured to reset a stored, maximum possible amplification factor ($V_{limit}$) if an antenna signal power (P) is detected which is less than the predefined lower limit value ($P_{min}/P_{G1}$), so that the maximum possible amplification factor ($V_{limit}$) is ignored in the event of a following adaptation until a new maximum possible amplification factor ($V_{limit}$) is stored.

7. Circuit arrangement according to claim 1, wherein the detection unit detects the antenna signal power (P) at the output of at least one allocated transmit signal amplifier to amplify an antenna signal emitted by the mobile terminal.

8. Circuit arrangement according to claim 1, wherein the control unit is configured to adapt the amplification factor (V) of at least one transmit signal amplifier to amplify an antenna signal emitted by the mobile terminal and to set a receive amplification factor of at least one allocated receive signal amplifier to amplify an antenna signal received via the antenna depending on the adapted amplification factor (V) for the transmit signal amplifier.

9. Method for compensating an attenuation (Ko, Ka, Ka1, Ka2) occurring in an antenna signal connection between a mobile terminal and an antenna by means of at least one signal amplifier in the antenna signal connection, comprising the steps of:
   detecting an antenna signal power (P) of the antenna signal in the signal path of the antenna signal connection,
   setting an amplification factor (V) of an allocated antenna signal amplifier, and adapting the amplification factor (V) at a rate of change slower than the control rate of an antenna signal power control loop between the coupled mobile terminal and a base station of a mobile network with which the mobile terminal has a communication connection, to regulate the transmit power of the mobile terminal at which an antenna signal is emitted by the mobile terminal if the detected antenna signal power (P) lies in a range of a predefined lower limit value ($P_{G1}$) for the detected antenna signal power and a predefined upper limit value ($P_{G2}$) for the detected antenna signal power (P).

10. Method according to claim 9, whereby said adapting the amplification factor (V) step is performed in a predefined setting range ($V_{min}$-$V_{max}$) for the amplification factor (V).

11. Method according to claim 9, wherein said setting step includes setting a predefined minimum amplification factor (V) if the detected antenna signal power (P) is less than the predefined lower limit value ($P_{G1}$).

12. Method according to claim 9, further comprising reducing the amplification factor (V) if the detected antenna signal power (P) is greater than a predefined maximum limit value ($P_{max}$), wherein the amplification factor (V) is reduced to a value at which the detected antenna signal power (P) is maximized to the predefined maximum limit value ($P_{max}$) but no longer exceeds the latter.

13. Method according to claim 12, further comprising storing a maximum possible amplification factor ($V_{limit}$) and taking account of the stored maximum possible amplification factor ($V_{limit}$) as a limit value at which an adaptation of the amplification factor (V) must no longer be exceeded.

14. Method according to claim 13, further comprising resetting the stored maximum possible amplification factor ($V_{limit}$) if an antenna signal power (P) is detected which is less than the predefined lower limit value ($P_{G1}$), wherein the reset maximum possible amplification factor ($V_{limit}$) is ignored in the event of a following adaptation until a new maximum possible amplification factor ($V_{limit}$) is stored.

15. Method according to claim 9, whereby said adapting the amplification factor (V) step includes adapting the amplification factor (V) of at least one transmit signal amplifier to amplify an antenna signal emitted by the mobile terminal and setting a receive amplification factor of at least one allocated receive signal amplifier to amplify an antenna signal received via the antenna depending on the adapted amplification factor (V) for the transmit signal amplifier.

* * * * *